(12) United States Patent
Wawer

(10) Patent No.: US 12,703,927 B2
(45) Date of Patent: Aug. 11, 2026

(54) POWER TOOL INCLUDING SWITCH WETTING

(71) Applicant: MILWAUKEE ELECTRIC TOOL CORPORATION, Brookfield, WI (US)

(72) Inventor: Peter J. Wawer, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 139 days.

(21) Appl. No.: 18/524,486

(22) Filed: Nov. 30, 2023

(65) Prior Publication Data

US 2024/0183060 A1 Jun. 6, 2024

Related U.S. Application Data

(60) Provisional application No. 63/385,661, filed on Dec. 1, 2022.

(51) Int. Cl.

| | |
|---|---|
| ***C25F 1/00*** | (2006.01) |
| ***H01H 1/60*** | (2006.01) |
| ***H01M 10/42*** | (2006.01) |
| ***H01M 50/247*** | (2021.01) |
| ***H02J 7/00*** | (2026.01) |

(52) U.S. Cl.

CPC ............... *C25F 1/00* (2013.01); *H01H 1/605* (2013.01); *H01M 10/425* (2013.01); *H01M 50/247* (2021.01); *H02J 7/855* (2026.01); *H01M 2220/30* (2013.01)

(58) Field of Classification Search

None

See application file for complete search history.

(56) References Cited

U.S. PATENT DOCUMENTS

| | | | | |
|---|---|---|---|---|
| 9,837,219 | B2 * | 12/2017 | Jefferies | H01H 9/167 |
| 2016/0091908 | A1 * | 3/2016 | Edwards | G05F 1/56 323/274 |
| 2018/0169851 | A1 * | 6/2018 | Radovich | B25F 5/02 |
| 2021/0336452 | A1 * | 10/2021 | Wu | B60L 53/00 |

* cited by examiner

*Primary Examiner* — Kaj K Olsen
*Assistant Examiner* — Pradhuman Parihar
(74) *Attorney, Agent, or Firm* — Michael Best & Friedrich LLP

(57) ABSTRACT

A method for removing oxidation of a contact of a trigger switch of a battery pack powered tool. The method includes receiving power from one or more battery packs coupled to the battery pack powered tool, determining, with a controller, that a trigger of the battery pack powered tool has been actuated, and providing, with a wetting circuit, power from the one or more battery packs to the contact to remove an oxidation surface film on the contact.

13 Claims, 8 Drawing Sheets

100
104
102
150
152
116
114
118
110

150
Trigger
415
Trigger Switch
417
Wetting circuit
400
Controller
475
Processing Unit
Control Unit
480
Arithmetic Logic Unit
485
Registers
455
490
460
Memory
Program Storage
Data Storage
465
Input Units
470
Output Units
300
405
450
PWM Drivers
495
Battery Pack Interface
118
Power Input
440
Sensor(s)
425
Indicator(s)
430
User Input
435

TRIG_SW_INPUT

700

R1

Q2

R3

R2

600

D1

R5

R4

R57

SWITCH_CTRL

C57

3V3

R8

Q1

R59

TRIG_SIG

Figure 6:
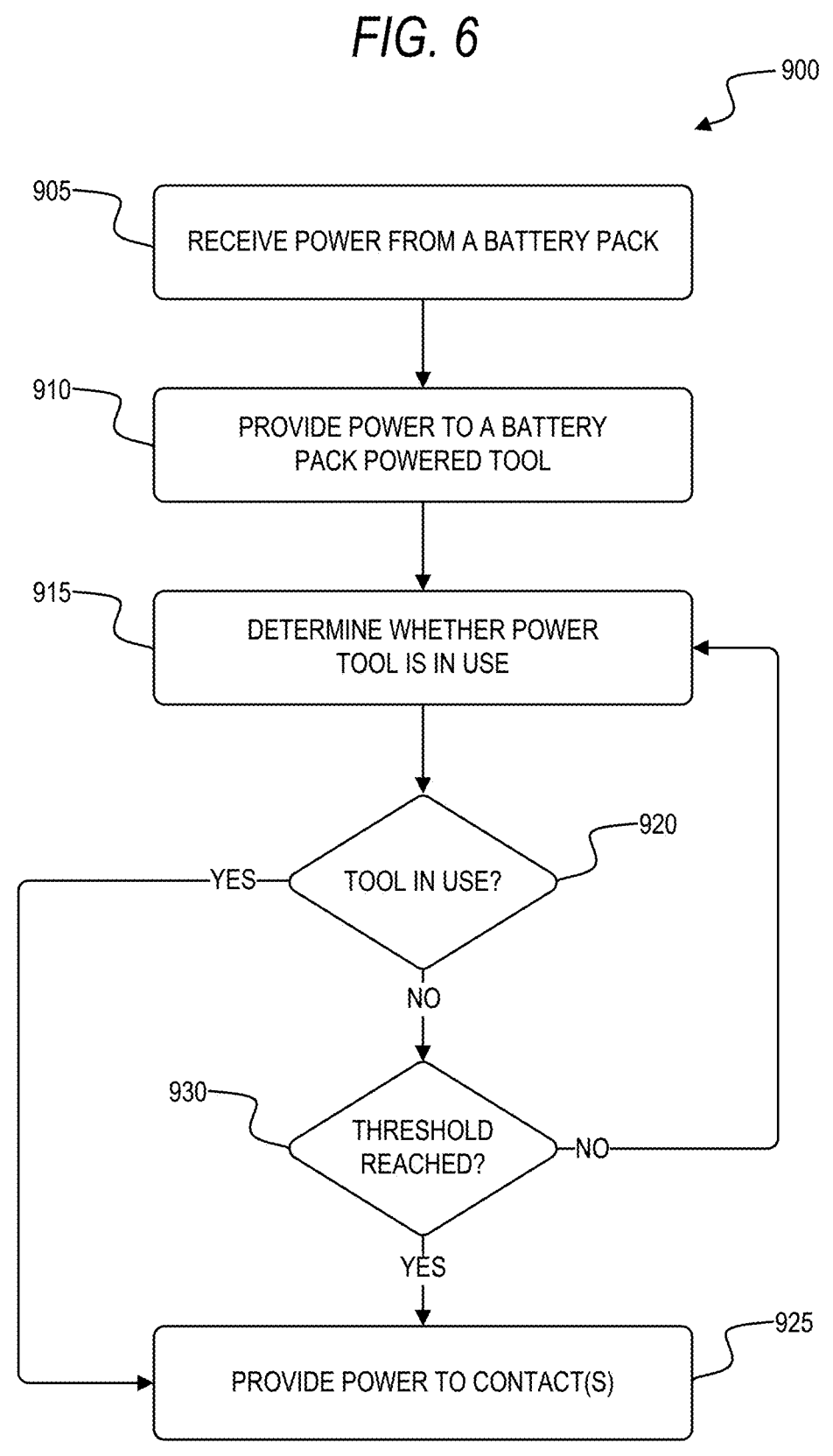

905 RECEIVE POWER FROM A BATTERY PACK

910 PROVIDE POWER TO A BATTERY PACK POWERED TOOL

915 DETERMINE WHETHER POWER TOOL IS IN USE

920 TOOL IN USE?

YES

NO

930 THRESHOLD REACHED?

NO

YES

925 PROVIDE POWER TO CONTACT(S)

POWER TOOL INCLUDING SWITCH WETTING

RELATED APPLICATIONS

This application claims the benefit of U.S. Provisional Patent Application No. 63/385,661, filed Dec. 1, 2022, the entire content of which is hereby incorporated by reference.

FIELD

The present disclosure relates to power tools.

SUMMARY

Power tools described herein include a battery pack interface configured to receive a battery pack, a switch including a contact, a wetting circuit configured to remove an oxidation surface film on the contact of the switch, and a controller. The controller is configured to determine that the switch has been actuated, and provide power from the battery pack to the contact of the switch to remove the oxidation surface film on the contact of the switch.

Methods described herein provide for removing oxidation of a contact of a switch of a battery pack powered tool. The methods include receiving power from one or more battery packs coupled to the battery pack powered tool, determining, with a controller, that a trigger of the battery pack powered tool has been actuated, and providing, with a wetting circuit, power from the one or more battery packs to the contact to remove an oxidation surface film on the contact.

Methods describe herein provide for removing oxidation of a contact of a switch of a battery pack powered tool. The methods include receiving power from a battery pack coupled to the battery pack powered tool, determining, with a controller, that a trigger of the battery pack powered tool is not actuated, determining, with the controller, that a temporal threshold of time has elapsed, and providing, with a wetting circuit, power from the battery pack to the contact to remove an oxidation surface film on the contact after the temporal threshold of time has elapsed.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the disclosure will become apparent by consideration of the detailed description and accompanying drawings.

BRIEF DESCRIPTION OF THE DRAWINGS

FIGS. 4A, 4B, 4C, and 4D illustrate wetting circuit diagrams for a switch of the power tool of FIG. 1, according to embodiments described herein.

FIG. 6 illustrates a process for switch wetting of a contact of the power tool of FIG. 1, according to embodiments described herein.

DETAILED DESCRIPTION

This disclosure relates to a wetting circuit for removing oxidation of a contact of a switch (e.g., a trigger switch) of a battery pack powered device, such as a power tool or accessory. Degradation of contacts in the battery pack powered device may cause faulty (e.g., unregistered) trigger presses by a user, which appear as a malfunction/unresponsive product in operation. The battery pack powered device can include a trigger assembly that includes a wetting circuit that provides power to contacts of an electrical switch of the battery pack powered device to remove oxidation that has built up during non-use and reliably maintain conductivity of the electrical switches and extend the longevity of the contacts of the device. It may further be beneficial for battery pack powered devices to keep their current consumption to a low or minimum value to ensure extended battery life of the connected battery packs and to avoid premature battery pack failure due to over-discharge events, in particular, for lithium-ion battery packs. Current consumption can be managed while removing an oxidation surface film from a contact when the device is not in use by keeping the quiescent current draw low when the device is not operating.

Figure 1:
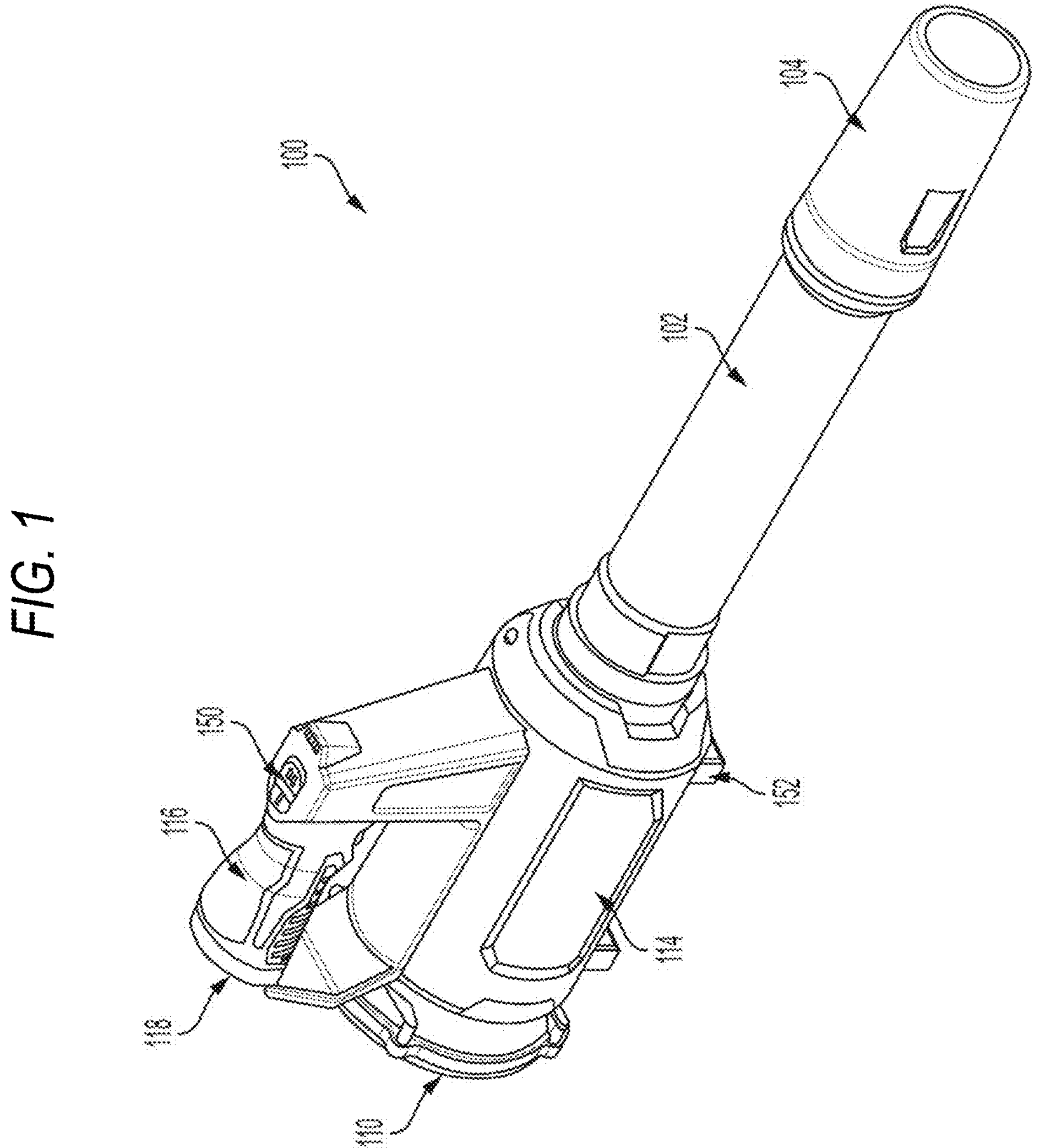
FIG. 1 is a perspective view of a power tool, according to embodiments described herein.

In some embodiments, the present disclosure can be implemented in a battery pack powered power tool or accessory. FIG. 1 provides an example battery pack powered tool 100 being a handheld blower 100 for implementing the features of the present disclosure. Although the present disclosure is discussed with respect to a battery pack powered handheld blower 100, the present disclosure can be implemented using any combination of battery pack powered tools 100 or accessories without departing from the scope of the present disclosure. For example, the present disclosure can be implemented in any combination of cutting tools, drilling tools, lawncare tools, lighting accessories, audio/visual accessories, power supplies, etc.

FIG. 1 generally illustrates the handheld blower 100 with three attachments including an extension 102 and a nozzle 104. Each of the extension 102 and the nozzle 104 is configured to removably connect to an outlet of the handheld blower 100. The nozzle 104 is also configured to removably connect to the extension 102. The handheld blower 100 further includes an inlet 110 opposite from and upstream of the outlet. In the illustrated embodiment, a grate is disposed over the inlet 110 in order to prevent larger debris from entering the inlet 110. The grate may be a structure creating a series of slits, a screen, a circuitous flow path, or the like. The handheld blower 100 includes an air duct fluidly communicating the inlet 110 with the outlet and extending along a longitudinal axis. The air duct is surrounded at least partially by a housing 114 of the battery pack powered tool 100. In some embodiments, the housing 114 may include two clamshell halves that are joined together with fasteners to surround an air duct. The handheld blower 100 further includes a handle 116. In some embodiments, the handle 116 extends generally parallel to the longitudinal axis.

In some embodiments, the housing 114 and/or the handle 116 may include a battery pack interface or battery pack receiving cavity 118 defined therein. In the illustrated embodiment, the battery pack receiving cavity 118 also extends generally parallel to the longitudinal axis. The battery pack receiving cavity 118 can be configured to receive at least a portion of one or more battery packs. While at least a portion of the battery pack is received in the battery pack receiving cavity 118 in an operational position, at least another portion of the battery pack can be disposed outside of the battery pack receiving cavity 118 (in a direction generally rearward of the handle 116 in the illustrated embodiment). The portion of the battery pack outside of the battery pack receiving cavity 118 is disposed radially outward from the longitudinal axis at a position that is above the inlet 110. With the battery pack within the battery pack receiving cavity 118, electrical communication can be established between the battery pack and the battery pack powered tool 100. The electrical communication link can be used to provide power from the battery pack to the battery pack powered tool 100, as well as allowing the battery pack powered tool 100 to manage the battery usage.

In some embodiments, the battery packs may be any combination of 12-volt, 18-volt, 36-volt, 40V, 80V, etc., battery packs. In some embodiments, the battery pack receiving cavity 118 can be designed to receive two 18-volt battery packs to provide, for example, a combined 36-volts to the battery pack powered tool 100. The battery pack(s) are provided to provide power to the battery pack powered tool 100 and its various components. In some embodiments, the battery pack(s) can provide a power source for the motor (for powering a fan of the blower), a microcontroller (e.g., controller 400 of FIG. 3), a wetting circuit 417 (see FIG. 3), pulse width modulation ("PWM") drivers 450 (e.g., a FET switching bridge) for a motor (see FIG. 3), etc.

The illustrated battery pack powered tool 100 may include many other features including, for instance, one or more triggers 150 or other controls (e.g., a switch, a button, etc.) disposed on or about the handle 116, a plurality of support feet 152 to allow a user to place the handheld blower 100 on a support surface, a plurality of vibration dampening sections (made of, for instance, a polymer material) connecting the air duct to the housing 114, a plurality of nozzle attachments and extension attachments of various shapes, sizes, and lengths, or the like.

Figure 2:
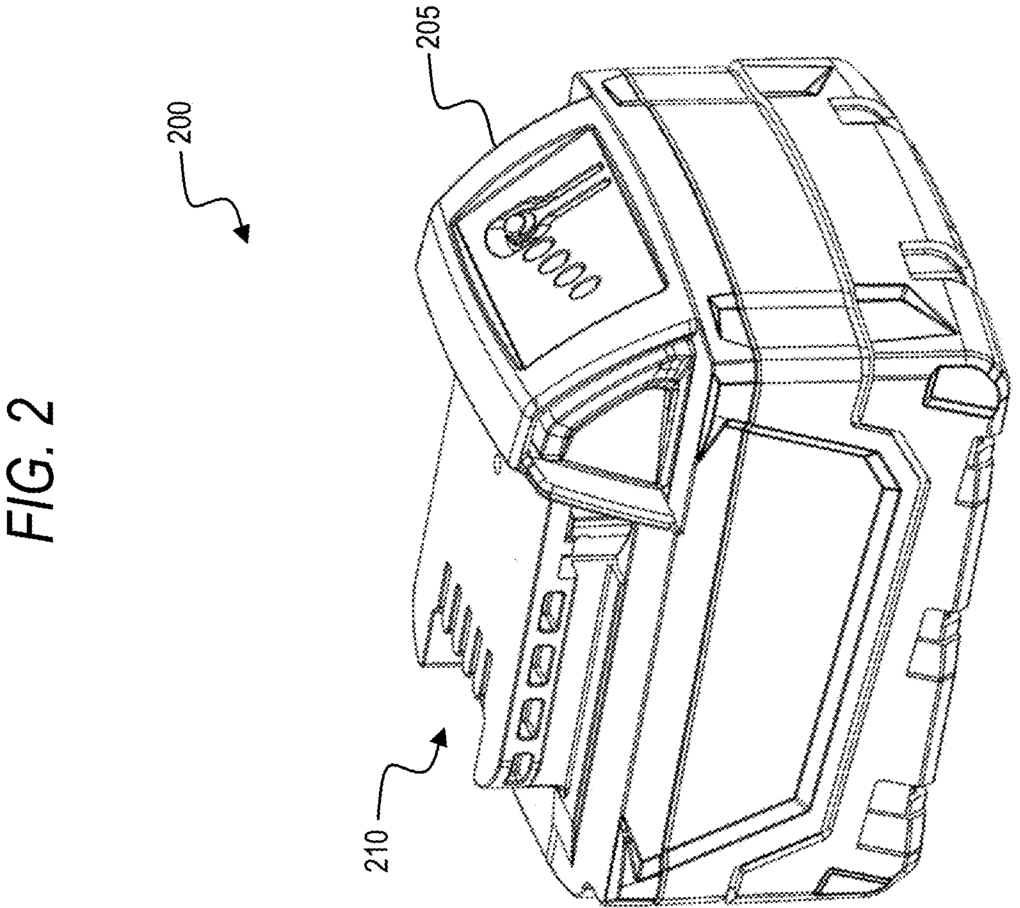
FIG. 2 illustrates a battery pack for the device of FIG. 1, according to embodiments described herein.

Referring to FIG. 2, a battery pack 200 including a housing 205 and battery pack interface 210 for connecting the battery pack 200 to a device (e.g., a battery pack powered tool 100) is depicted. The discharge of the battery pack 200 can be controlled by any combination of a battery pack controller, a power tool, a battery pack charger, etc., as provided by the present disclosure. The battery pack 200 can be an 18-volt or 36-volt battery pack, although other voltages between 12-volts and 120-volts are contemplated. The battery pack interface 210 includes a combination of mechanical components (e.g., rails, grooves, latches, etc.) and electrical components (e.g., one or more terminals) configured to and operable for interfacing (e.g., mechanically, electrically, and communicatively connecting) the battery pack powered tool 100 with the battery pack 200. For example, power provided by the battery pack 200 to the battery pack powered tool 100 is provided through the battery pack interface 210 to a power input module 440 (sec FIG. 3).

Figure 3:
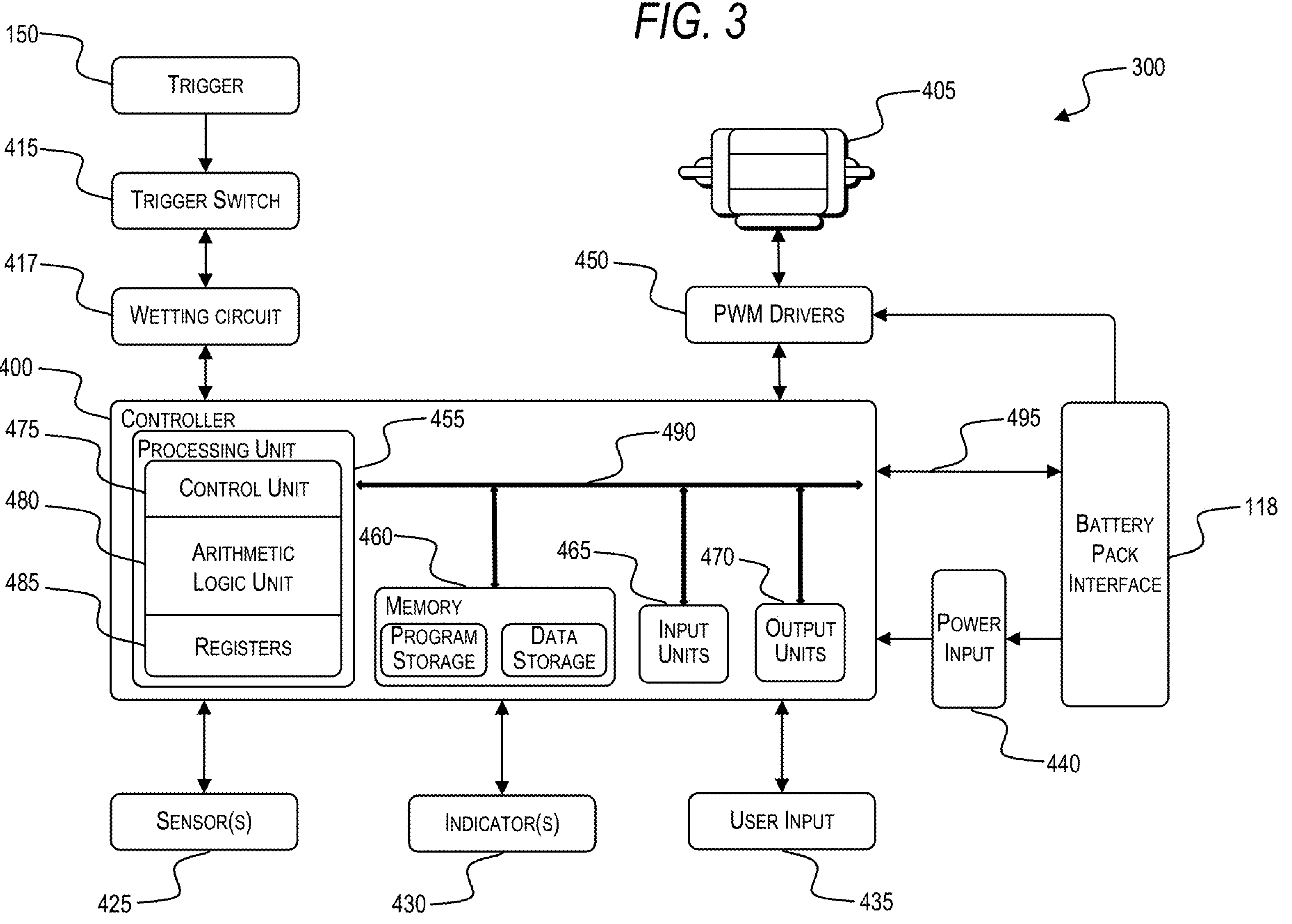
FIG. 3 illustrates a control system for the power tool of FIG. 1, according to embodiments described herein.

FIG. 3 illustrates an example control system 300 for a battery pack powered device (e.g., a battery pack powered tool 100). The control system 300 includes a controller 400 electrically and/or communicatively connected to a variety of modules or components of the battery pack powered tool 100. For example, the illustrated controller 400 is electrically connected (e.g., directly, indirectly through sub circuits, etc.) to a motor 405, a battery pack interface 118, a trigger switch or switch 415 (connected to a trigger 150), the wetting circuit 417 (e.g., connected to the trigger switch 415), one or more sensors 425 or sensing circuits (e.g., one or more current sensors, one or more speed sensors, one or more Hall Effect sensors, one or more temperature sensors, etc.), one or more indicators 430, a user input module 435, a power input module 440, and PWM drivers 450 (or a field effect transistor [FET] in a bridge configuration module including a plurality of switching FETs). The controller 400 includes combinations of hardware and software that are operable to, among other things, control the operation of the battery pack powered tool 100, monitor the operation of the battery pack powered tool 100, activate the one or more indicators 430 (e.g., light emitting diodes (LEDs), monitor user behavior and actions, application behavior, etc.

In some embodiments, the controller 400 includes a plurality of electrical and electronic components that provide power, operational control, and protection to the components and modules within the controller 400 and/or the battery pack powered tool 100. For example, the controller 400 includes, among other things, a processing unit 455 (e.g., a microprocessor, a microcontroller, an electronic processor, an electronic controller, or another suitable programmable device), a memory 460, input units 465, and output units 470. The processing unit 455 includes, among other things, a control unit 475, an arithmetic logic unit ("ALU") 480, and a plurality of registers 485 (shown as a group of registers in FIG. 3), and is implemented using a known computer architecture (e.g., a modified Harvard architecture, a von Neumann architecture, etc.). The processing unit 455, the memory 460, the input units 465, and the output units 470, as well as the various modules or circuits connected to the controller 400 are connected by one or more control and/or data buses (e.g., common bus 490). The control and/or data buses are shown generally in FIG. 3 for illustrative purposes. The use of one or more control and/or data buses for the interconnection between and communication among the various modules, circuits, and components would be known to a person skilled in the art in view of the disclosure described herein.

The memory 460 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, SSD, an SD card, or other suitable magnetic, optical, physical, or electronic memory devices. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the battery pack powered tool 100 can be stored in the memory 460 of the controller 400. The software includes, for example, firmware, one or more applications, program data, filters, rules, one or more program modules, and other executable instructions. The controller 400 is configured to retrieve from the memory 460 and execute, among other things, instructions related to the control processes and methods described herein. In other constructions, the controller 400 includes additional, fewer, or different components.

The indicators 430 include one or more visual, audio or haptic feedbacks to provide feedback to a user as to the status of the battery pack powered tool 100 and/or battery pack 200. For example, indicators 430 can include one or more light-emitting diodes ("LEDs"). The indicators 430 can be configured to display conditions of, or information associated with, the battery pack powered tool 100. For example, the indicators 430 are configured to indicate measured electrical characteristics of the battery pack powered tool 100, the status of the battery pack(s) 200, etc. The user input module 435 is operably coupled to the controller 400 to, for example, select a forward mode of operation or a reverse mode of operation, a torque and/or speed setting for the battery pack powered tool 100 (e.g., using torque and/or speed switches), etc. In some embodiments, the user input module 435 includes a combination of digital and analog input or output devices required to achieve a desired level of operation for the battery pack powered tool 100, such as one or more knobs, one or more dials, one or more switches, one or more buttons, one or more touch or pressure sensitive sensors, etc.

The power input module 440 includes combinations of active and passive components to regulate or control the power received from the battery pack 200 prior to power being provided to the controller 400. The battery pack interface 118 also supplies power to the PWM drivers 450 to selectively provide power to the motor 405. The battery pack interface 118 also includes, for example, a communication line 495 for provided a communication line or link between the controller 400 and the battery pack 200.

The wetting circuit 417 is operably coupled to the controller 400 to, for example, remove an oxidation film on a surface of a contact of the trigger switch 415 of the battery pack powered tool 100. The wetting circuit 417 provides a voltage and current (e.g., a minimal voltage and current) to the contact from the battery pack 200. Providing the trigger switch 415 with an amount of power (e.g., "wetting" or "fritting" current and/or voltage) removes a surface film of oxidation (e.g., contact oxidation) that forms on the contacts. The surface film of oxidation may create a surface film resistance that results in switches remaining electrically "open" when, for example, the trigger 150 is actuated by a user of the battery pack powered tool 100. In some embodiments, the wetting circuit 417 is operably coupled to the controller 400 to control power provided from the battery pack 200 to the trigger switch 415. In some embodiments, the wetting circuit 417 to provide power (e.g., a predetermined voltage and/or current) from the battery pack powered tool 100 to one or more contacts of the trigger switch 415 (e.g., a positive voltage contact, a negative voltage contact, an input contact, an output contact, etc.).

Figure 4A:
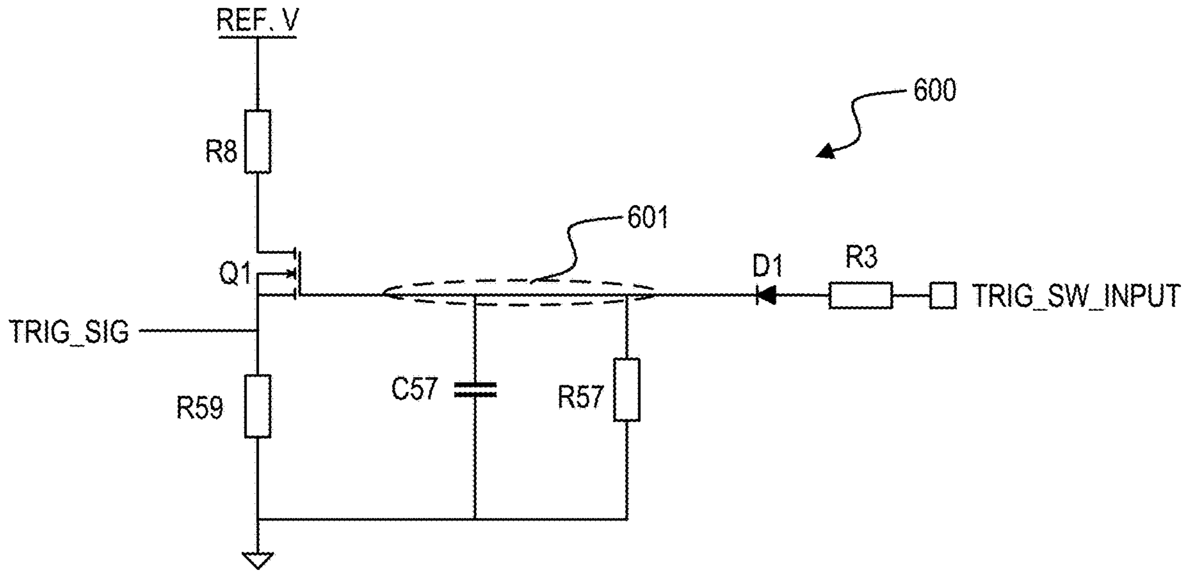

Referring to FIG. 4A, a circuit 600 for implementing the wetting circuit 417 of the battery pack powered tool 100 is depicted. FIG. 4A shows the circuit 600 that provides a wetting current to contacts of, for example, the trigger switch 415. The circuit 600 is configured to receive a trigger input signal (e.g., TRIG_SW_INPUT) from the trigger 150/switch 415. In some embodiments, the trigger input signal illustrated, for example, in FIG. 4A corresponds to the contact of the trigger switch 415. The circuit 600 provides a trigger signal (e.g., TRIG_SIG) to the controller 400, which operates the battery pack powered tool 100 based on the trigger signal. The circuit 600 includes a node 601. One or more components of the circuit 600 are connected to the node 601. A first branch of the circuit 600 includes a diode D1 connected to a resistor R3, a cathode of the diode D1 is connected to the node 601. The resistor R3 is connected to an output of the trigger switch 415, which provides the trigger input signal. A second branch of the circuit 600 includes a resistor R57 connected to the node 601 and to ground. A third branch of the circuit 600 includes a capacitor C57 connected to the node 601 and a ground. The second branch and the third branch are connected in parallel with one another between the node 601 and ground. A fourth branch of the circuit 600 includes an electrical switch Q1 (e.g., a transistor, a FET, a MOSFET, etc.). A gate of the electrical switch Q1 is connected to the node 601. A drain of the electrical switch Q1 is connected to a load resistor R8. The load resistor R8 is connected to a reference voltage (e.g., 3.3V). A source of the electrical switch Q1 connected to a resistor R59, and the resistor R59 is connected to ground. The source of the electrical switch Q1 is configured to provide the trigger signal to the controller 400. During operation, the circuit 600 is configured to provide an inrush wetting current through the capacitor C57 when the electrical switch Q1 is closed. The circuit 600 advantageously maintains a low current draw during operation. The circuit 600 provided in FIG. 4A uses, for example, an insulated-gate bipolar transistors (IGBT) as the electrical switch Q1. However, other types of switches can also be used. For example, the IGBTs can be replaced by MOSFETs.

Figure 4B:
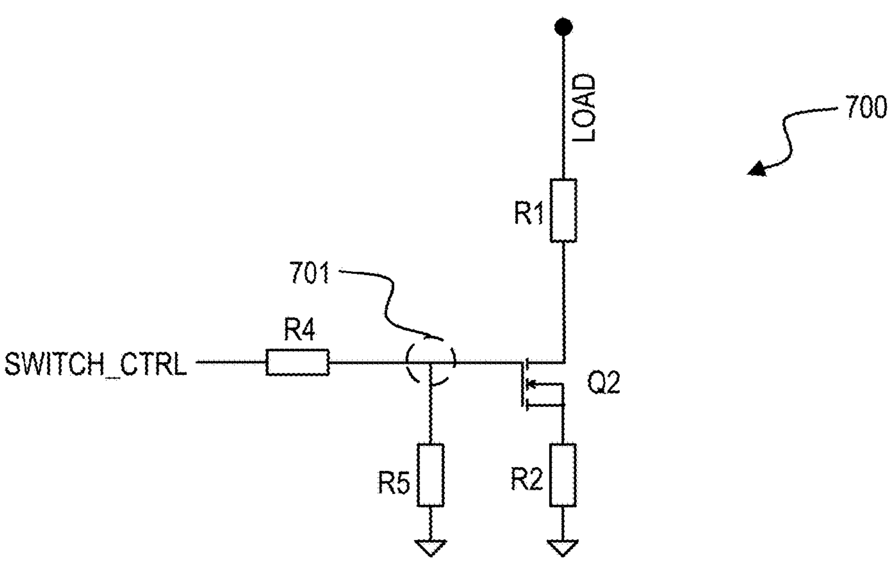

Referring to FIG. 4B, a circuit 700 for implementing the wetting circuit 417 of the battery pack powered tool 100 is depicted. In some embodiments, the circuit 700 is configured to be used in conjunction with the circuit 600. FIG. 4B shows the circuit 700 that provides a switch control signal (e.g., SWITCH_CTRL) to an electrical switch that controls the power drawn for wetting contacts of the trigger switch 415. The circuit 700 is configured to receive the switch control signal from the controller 400. The circuit 700 includes a node 701. One or more components of the circuit 700 are connected to the node 701. A first branch of the circuit 700 includes a resistor R4 connected to the node 701 and an output of the controller 400, which provides the switch control signal. A second branch of the circuit 700 includes a resistor R5 connected to the node 701 and to ground. A third branch of the circuit 700 includes an electrical switch Q2. A gate of the electrical switch Q2 is connected to the node 701. A drain of the electrical switch Q2 is connected to a resistor R1. The load resistor R1 is connected to a load. A source of the electrical switch Q2 is connected to a resistor R2. The resistor R2 is connected to ground. The electrical switch Q2 may be any form of electrical switch as discussed herein with respect to the electrical switch Q1 (e.g., a transistor, a FET, a MOSFET, an IGBT, etc.).

During operation, the circuit 700 is configured to utilize the electrical switch Q2 to control when wetting power is drawn through an electrical switch. Resistors R4 and R5 function as current limiters to the control signal input of the electrical switch Q2. In some embodiments, the values of the resistors R4 and R5 can vary. In some embodiments, the resistors R4 and R5 may be de-populated or removed from the circuit 700. Additionally, the resistors R1 and R2 can either be used individually or together. However, in some instances, simultaneous use of both of the resistors R1 and R2 is not required for implementing the circuit 700. In some embodiments, the values of the resistors R1 and R2 values of these resistances are subject to change depending upon the application.

Figure 4C:
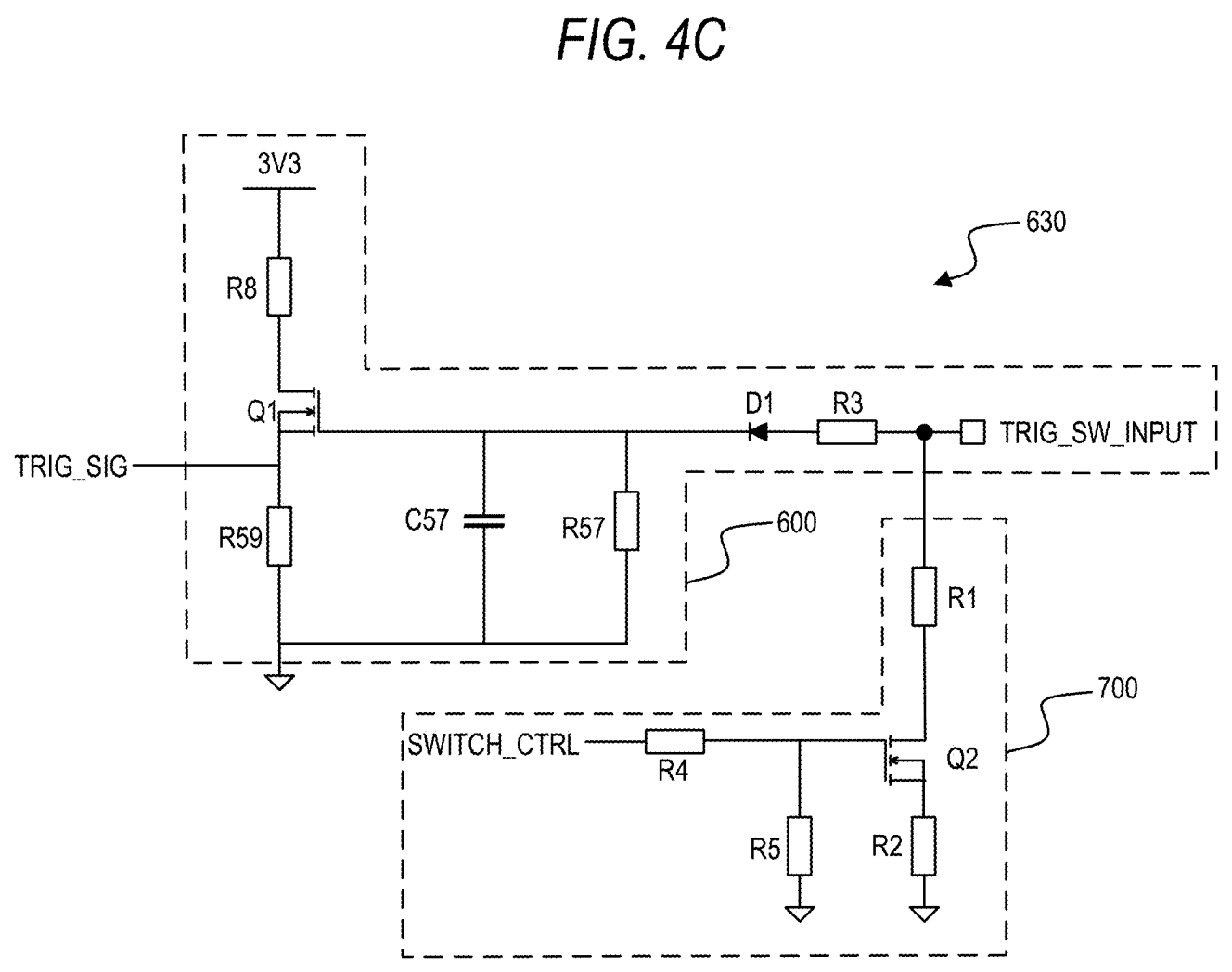

In some embodiments, the circuit 700 can be combined with the circuit 600, as depicted in FIG. 4C. FIG. 4C illustrates a circuit 630 that includes the circuit 600 and the circuit 700. The circuit 600 is configured to receive a trigger input signal (e.g., TRIG_SW_INPUT) from the trigger 150/switch 415. The circuit 600 provides a trigger signal (e.g., TRIG_SIG) to the controller 400, which operates the battery pack powered tool 100 based on the trigger signal. The circuit 630 is also configured to receive the switch control signal (e.g., SWITCH_CTRL) from the controller 400 via the circuit 700. The circuit 630 allows the controller 400 to send a switch control signal to remove an oxidation film on a surface of a contact of the trigger switch 415 of the battery pack powered tool 100 when the battery pack powered tool is not in use. The resistor R1 of the circuit 700 is connected to the circuit 600 between the output of the trigger 150/switch 415 and the resistor R3. When the battery pack powered tool 100 is not in use, the circuit 630 can be controlled to draw wetting power and keeps the quiescent current draw of the battery pack powered tool 100 low. In some embodiments, the circuit 700 is connectable to different locations in the circuit 600. For example, the circuit 700 can be connected to the circuit 600 between the diode D1 and the resistor R3, the diode D1 and the capacitor C57, the diode D1 and the resistor R57, etc.

Figure 4D:
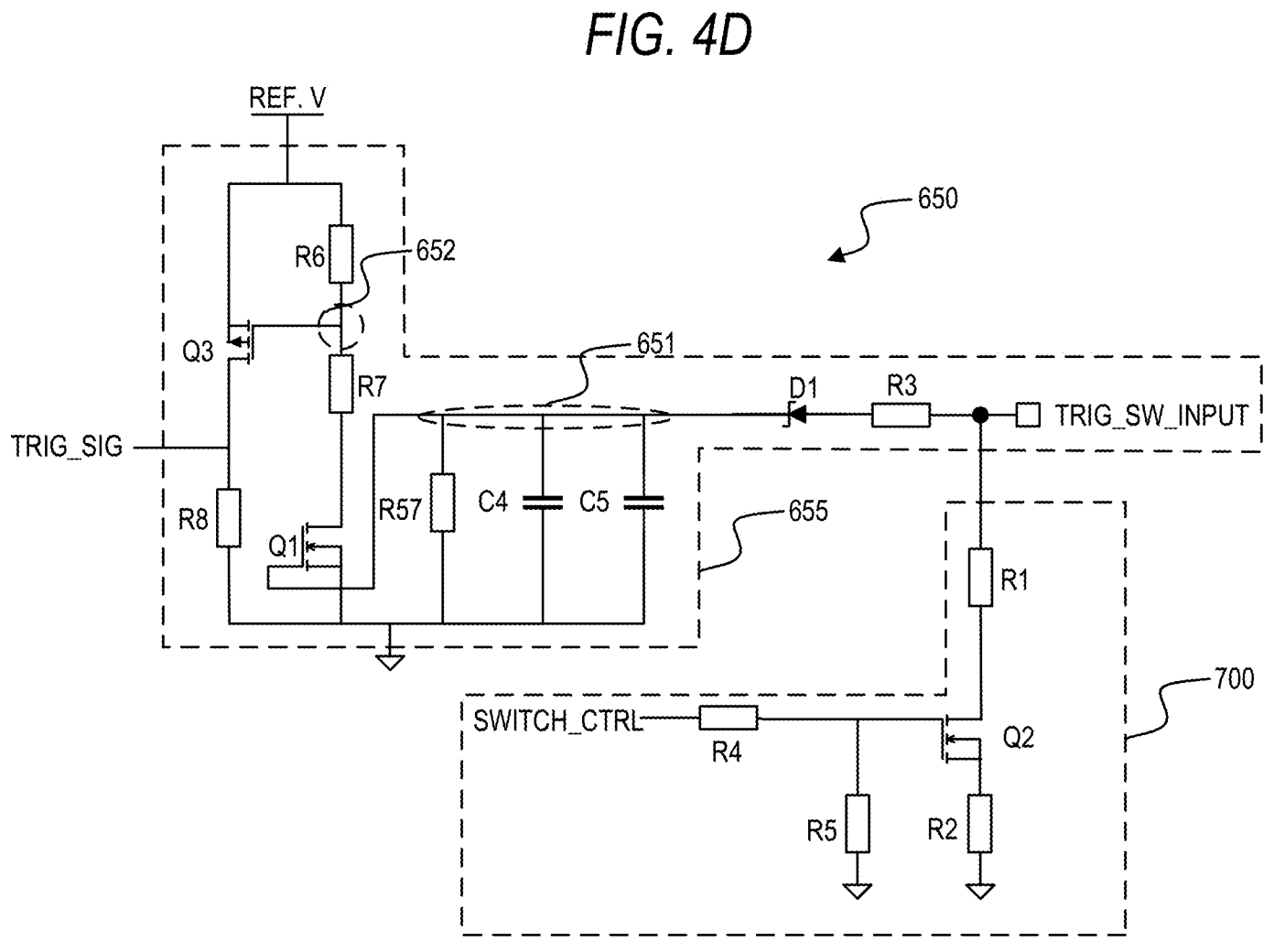

Referring to FIG. 4D, a circuit 650 for implementing the wetting circuit 417 of the battery pack powered tool 100 is depicted. FIG. 4D illustrates the circuit 650 that includes a circuit 655 and the circuit 700. The circuit 650 that provides a switch control signal (e.g., SWITCH_CTRL) to an electrical switch that controls the power drawn for wetting contacts of the trigger switch 415. The circuit 650 is configured to receive a trigger input signal (e.g., TRIG_SW_INPUT) from the trigger 150/switch 415. The circuit 650 provides a trigger signal (e.g., TRIG_SIG) to the controller 400, which operates the battery pack powered tool 100 based on the trigger signal. The circuit 650 is also configured to receive the switch control signal (e.g., SWITCH_CTRL) from the controller 400 via the circuit 700. The circuit 650 allows the controller 400 to send a switch control signal to remove an oxidation film on a surface of a contact of the trigger switch 415 of the battery pack powered tool 100 when the battery pack powered tool is not in use.

The circuit 655 includes a node 651 and a node 652. One or more components of the circuit 650 are connected to the node 651. A first branch of the circuit 655 includes a diode D1 (e.g., a Zener diode) connected to a resistor R3. A cathode of the diode D1 connected to the node 651. The resistor R3 is connected to an output of the trigger switch 415, which provides the trigger input signal. A second branch of the circuit 655 includes a capacitor C5 connected to the node 651 and to ground. A third branch of the circuit 655 includes a capacitor C4 connected to the node 651 and to ground. A fourth branch of the circuit 650 includes a resistor R57 connected to the node 651 and to ground. The second branch, the third branch, and the fourth branch are connected in parallel with one another between the node 651 and ground. A fifth branch of the circuit 655 includes an electrical switch Q1 (e.g., a transistor, a FET, a MOSFET, an IGBT, etc.). A gate of the electrical switch Q1 connected to the node 651. A drain of the electrical switch Q1 connected to a resistor R7. The resistor R7 is connected to the node 652. The drain of the electrical switch Q1 is configured to provide a control signal to the node 652. A source of the electrical switch Q1 connected to ground.

A sixth branch of the circuit 655 includes an electrical switch Q3 (e.g., a p-type MOSFET). A gate of the electrical switch Q3 is connected to the node 652. A drain of the electrical switch Q3 is connected to a resistor R8. The resistor R8 is connected to ground. The drain of the electrical switch Q3 is configured to provide the trigger signal to the controller 400. A source of the electrical switch Q3 connected to a reference voltage (e.g., 3.3V). A seventh branch of the circuit 655 includes a resistor R6 connected to the node 652 and to the reference voltage (e.g., 3.3V). The resistor R1 of the circuit 700 is connected to the circuit 655 between the output of the trigger 150/switch 415 and the resistor R3. When the battery pack powered tool 100 is not in use, the circuit 655 can be controlled to draw wetting power and keeps the quiescent current draw of the battery pack powered tool 100 low. In some embodiments, the circuit 700 is connectable to multiple locations in the circuit 655. For example, the circuit 700 can be connected to the circuit 655 between the diode D1 and the resistor R3, the diode D1 and the capacitor C5, the diode D1 and the capacitor C4, the diode D1 and the resistor R57, etc.

In some embodiments, the controller 400 can include one or more oxidation management systems for removing oxidation film on a surface of a contact of a switch in one or more sub-systems of the battery pack powered tool 100. In some embodiments, the oxidation management system can include the controller 400, a switch, and the wetting circuit 417 that can control oxidation film build-up on a surface of a contact of the switch by enabling or activating the wetting circuit 417. The sub circuits can include sub systems within the battery pack powered tool 100. The sub circuits can include peripheral systems, a motor control system, sensor systems, communication systems, switching systems, etc. For example, to prevent contacts of the plurality of switching FETs of the PWM drivers 450 from accumulating oxidation film, the oxidation management system described herein can be implemented to provide the minimum power needed to flow through a contact to break through the surface film resistance of the contact of the battery pack powered tool 100.

Figure 5:
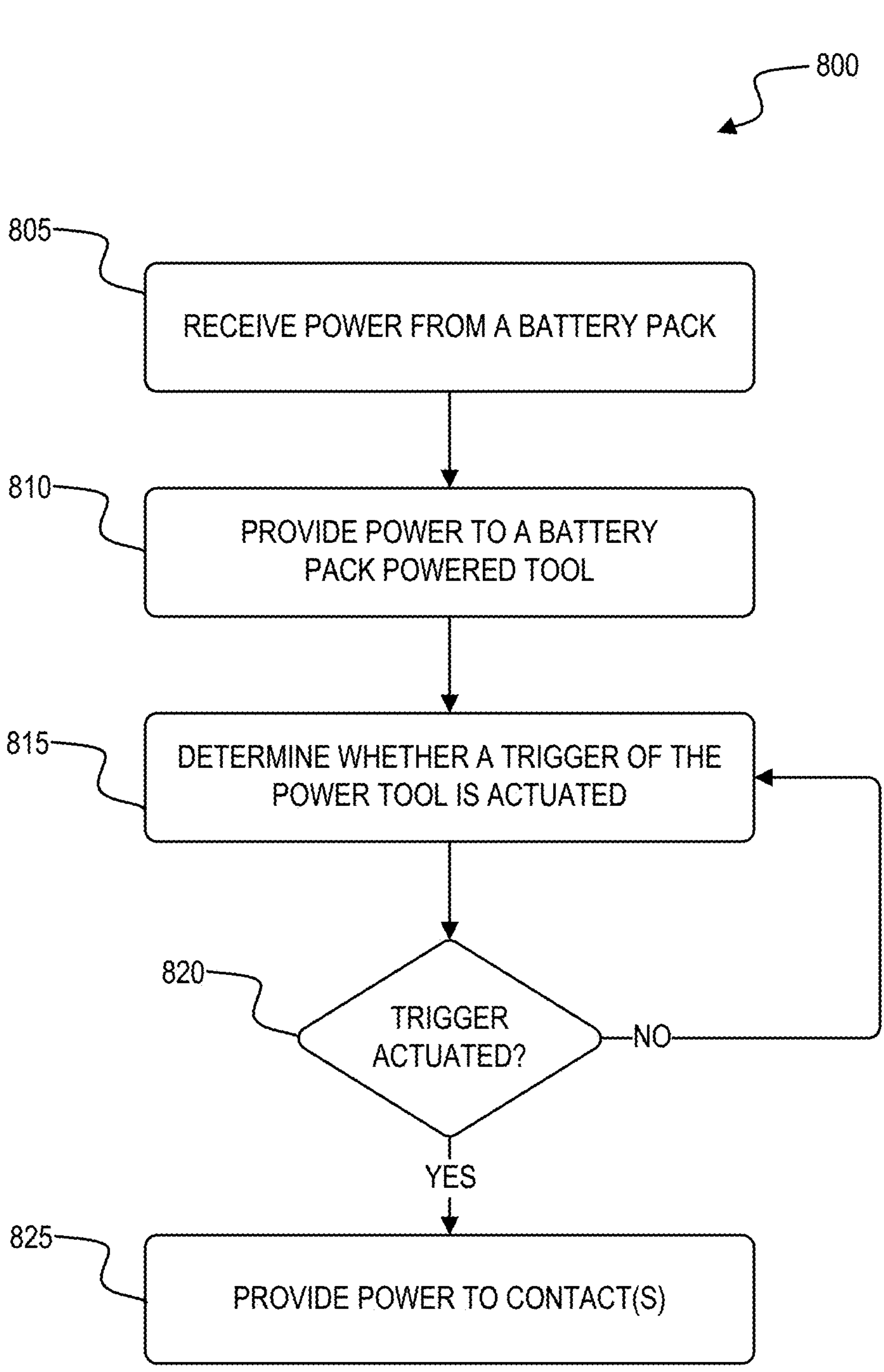
FIG. 5 illustrates a process for switch wetting of a contact of the power tool of FIG. 1, according to embodiments described herein.

FIG. 5 illustrates a method 800 executed by the controller 400 of the battery pack powered tool 100. The controller 400 receives a voltage signal from the battery pack 200 and determines that a battery pack 200 is coupled to the battery pack powered tool 100 (STEP 805). The controller 400 provides power to a variety of modules or components of the battery pack powered tool 100 (STEP 810). The controller 400 determines whether the trigger 150 of the battery pack powered tool 100 is actuated (STEP 815). For example, when the controller 400 receives a signal from the trigger 150, the controller 400 determines that the trigger 150 is being pulled and that the battery pack powered tool 100 is in use. If, at STEP 820, the trigger 150 is actuated, the wetting circuit 417 of the battery pack powered tool 100 provides power (e.g., an inrush current) to a contact of the trigger switch 415 (STEP 825). When, for example, the controller 400 stops receiving a signal from the trigger 150, the controller 400 determines that the trigger 150 is released and the battery pack powered tool 100 is not in use. When the battery pack powered tool 100 is not in use, the wetting circuit 417 of the battery pack powered tool 100 does not provide power to the contact of the trigger switch 415. In some embodiments, after a defined time period (e.g., temporal threshold) has elapsed without receiving a signal from the trigger 150, the controller 400 determines that the battery pack powered tool 100 is not in use. In such instances, after the time period has elapsed, the controller 400 can control the wetting circuit 417 to provide power to the contact of the trigger switch 415 to remove any built-up oxidation, as described with respect to FIG. 6.

FIG. 6 illustrates a method 900 executed by the controller 400 of the battery pack powered tool 100. The controller 400 receives a voltage signal from the battery pack 200 and determines that a battery pack 200 is coupled to the battery pack powered tool 100 (STEP 905). The controller 400 provides power to a variety of modules or components of the battery pack powered tool 100 (STEP 910). The controller 400 determines whether the battery pack powered tool 100 is in use (STEP 915). For example, when the controller 400 receives a signal from the trigger 150, the controller 400 determines that the trigger 150 is being pulled and that the battery pack powered tool 100 is in use. If, at STEP 920, the battery pack powered tool 100 is in use, the wetting circuit 417 of the battery pack powered tool 100 provides power to a contact of the trigger switch 415 (STEP 925). When, for example, the controller 400 stops receiving a signal from the trigger 150, the controller 400 determines that the trigger 150 is released and the battery pack powered tool 100 is not in use. If, at STEP 920, the battery pack powered tool 100 is not in use, the controller 400 determines whether a threshold time period has elapsed (STEP 930).

For example, the controller 400 stops receiving a signal from the trigger 150, the controller 400 initiates a timer and determines whether the threshold time period has elapsed. When, for example, the controller 400 determines that the threshold time period has elapsed, the controller 400 generates a signal that provides power to the contact of the trigger switch 415. In another example, when the controller 400 determines that the threshold time period has elapsed, the controller 400 determines whether the battery pack powered tool 100 is once again in use during the threshold time period and the method proceeds to STEP 925. In some embodiments, the threshold time period is a defined time period (e.g., temporal threshold) that has elapsed without receiving a signal from the trigger 150. In some embodiments, the time period can be in the range of milliseconds, seconds, minutes, hours, days, weeks, months, or years, depending upon how frequently oxidation on switch contacts should be cleared.

Although the disclosure has been described in detail with reference to certain preferred embodiments, variations and modifications exist within the scope and spirit of one or more independent aspects of the disclosure as described.

What is claimed is:

1. A power tool comprising:
- a battery pack interface configured to receive a battery pack;
- a switch including a contact;
- a wetting circuit configured to remove an oxidation surface film on the contact of the switch; and
- a controller configured to:
  - determine that the switch has been actuated, and provide power from the battery pack to the contact of the switch in response to determining that the switch has been actuated in order to remove the oxidation surface film on the contact of the switch.

2. The power tool of claim 1, wherein the power from the battery pack to the contact to remove the oxidation surface film on the contact is a minimum power amount to overcome the oxidation surface film on the contact.

3. The power tool of claim 1, wherein the power from the battery pack to the contact to remove the oxidation surface film on the contact is an inrush current.

4. The power tool of claim 1, wherein the wetting circuit further includes:

a node connected to a second switch, the second switch configured to be turned on in response to the switch being actuated.

5. The power tool of claim 4, wherein:

the node is connected to a resistor, a capacitor, and a diode;

the resistor and the capacitor are connected in parallel with one another; and the second switch is connected to a cathode of the diode.

6. The power tool of claim 5, wherein the diode is a Zener diode.

7. The power tool of claim 5, wherein the wetting circuit further includes:

a third switch configured to limit power from the battery pack to the contact of the switch.

8. The power tool of claim 7, wherein the wetting circuit further includes:

a second node connected to the third switch, a second resistor, and a third resistor, wherein the second resistor is connected an output of the controller.

9. The power tool of claim 8, wherein a value of the second resistor and the third resistor vary to limit power from the battery pack to the contact of the switch.

10. The power tool of claim 7, wherein the wetting circuit further includes:

a fourth switch configured to provide a signal indicating the switch is actuated to the controller.

11. The power tool of claim 10, wherein the wetting circuit further includes:

a third node connected to a gate of the fourth switch.

12. The power tool of claim 1, wherein the controller is further configured to:

determine that the switch of the power tool is no longer being actuated, and generate a signal to enable the wetting circuit in response to a temporal threshold having elapsed from a time when the switch is no longer being actuated.

13. The power tool of claim 1, wherein the switch is a trigger switch.

* * * * *